June 25, 1957 V. J. HILGOE 2,797,084
STRAIGHT AND COLLECT DELIVERY MECHANISM
Filed Oct. 19, 1953 11 Sheets-Sheet 1

INVENTOR
Vernon J. Hilgoe
Carlson, Pitzner, Hubbard + Wolfe
ATTORNEY

June 25, 1957 V. J. HILGOE 2,797,084
STRAIGHT AND COLLECT DELIVERY MECHANISM
Filed Oct. 19, 1953 11 Sheets-Sheet 2
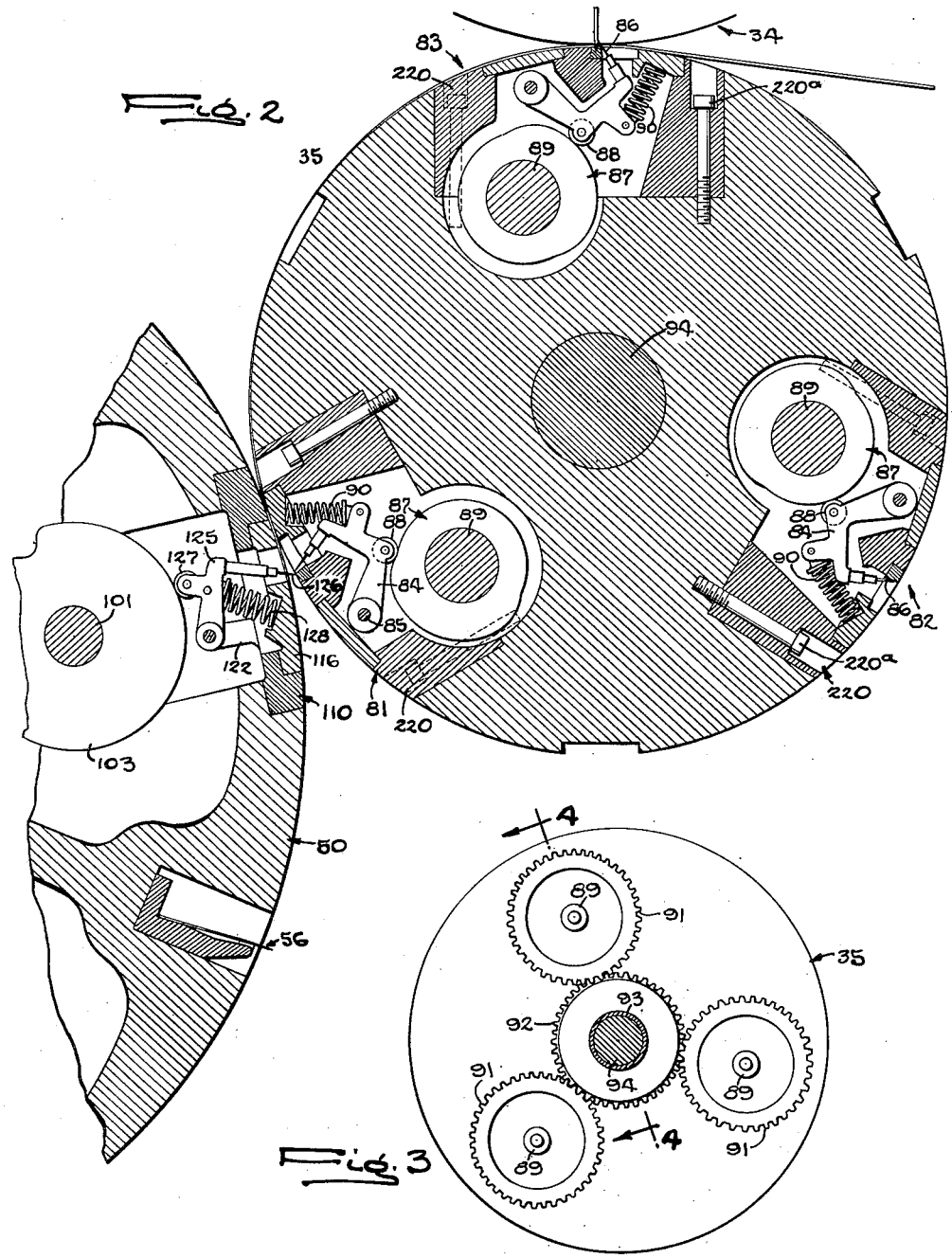

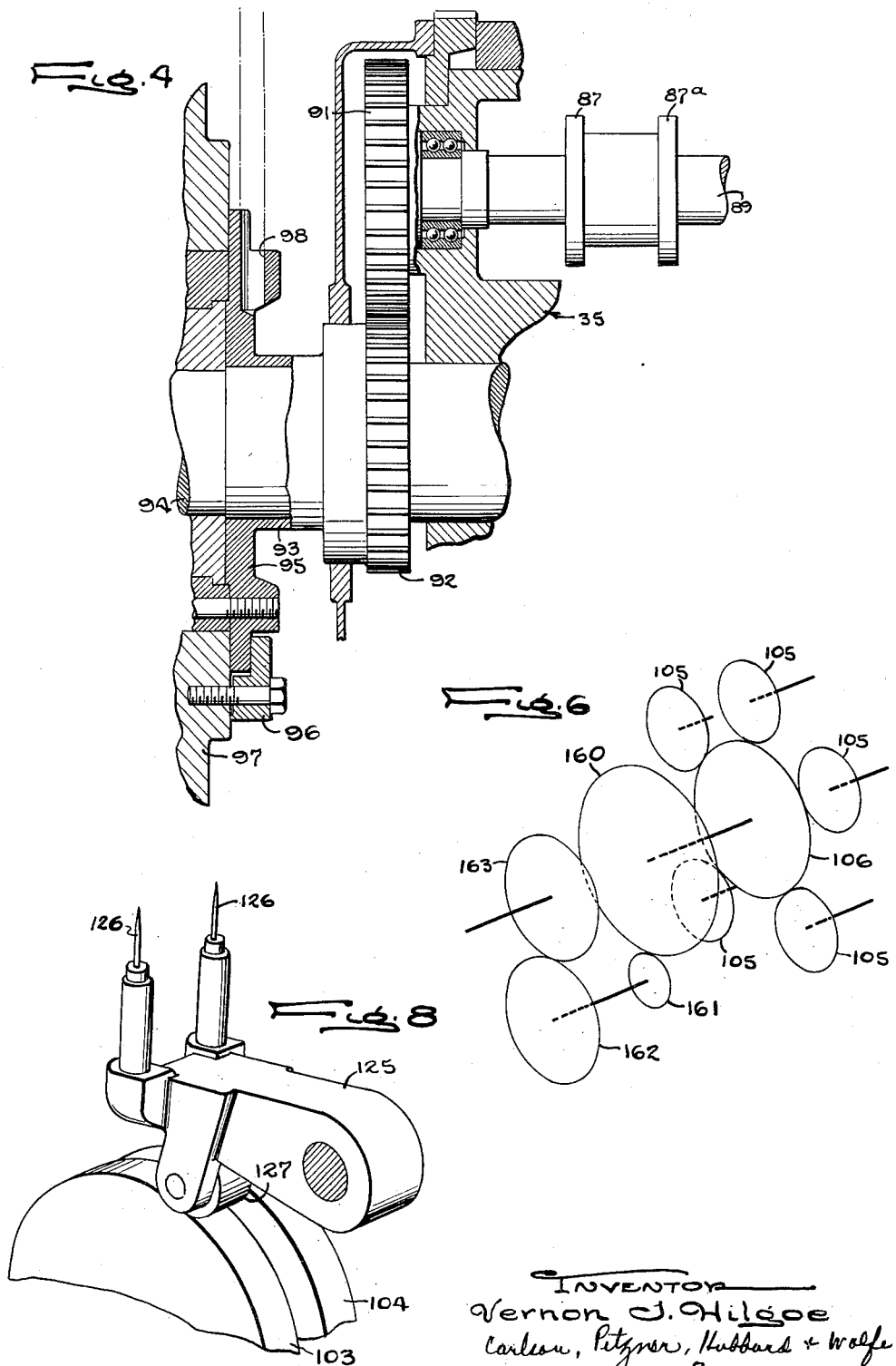

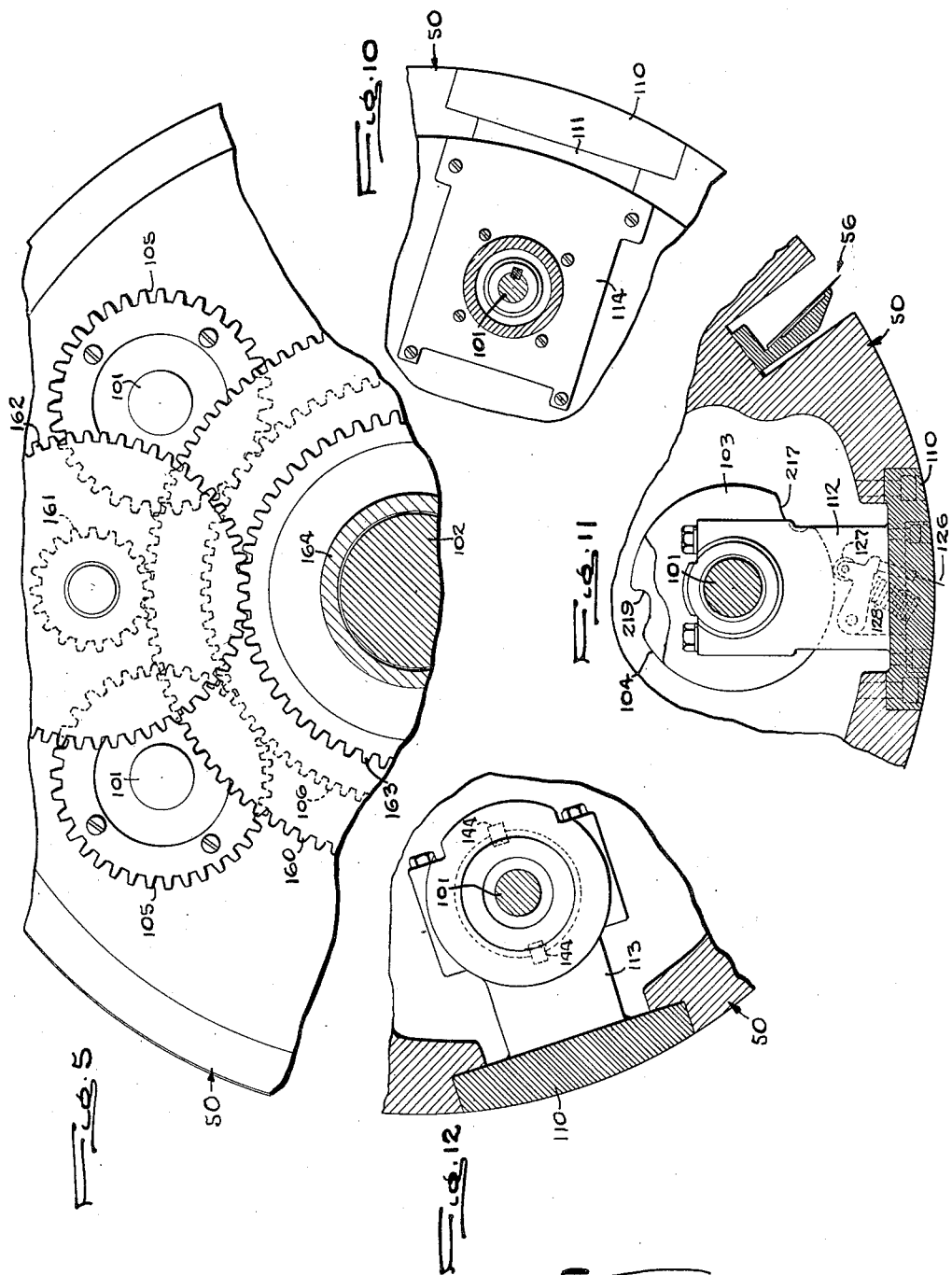

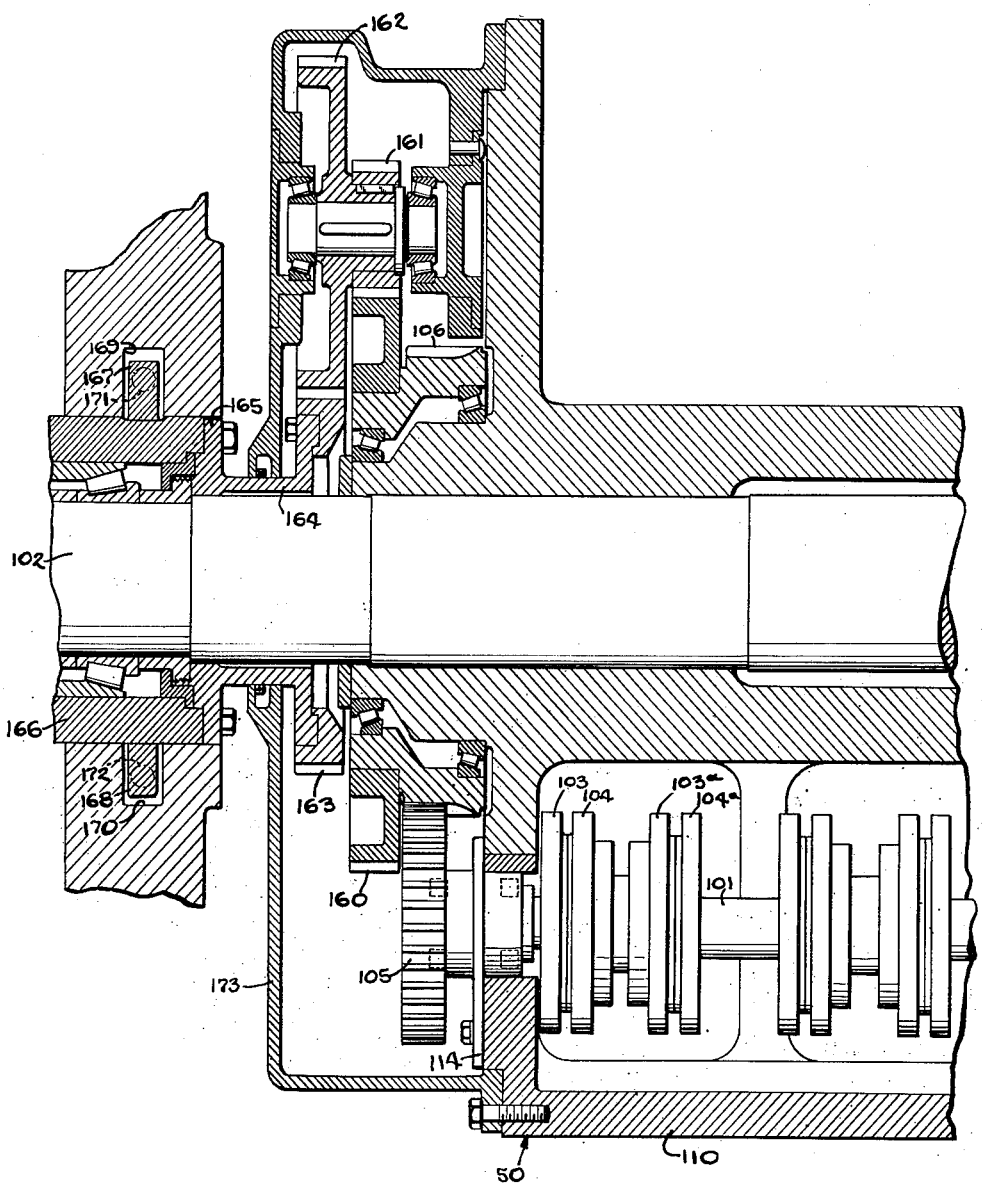

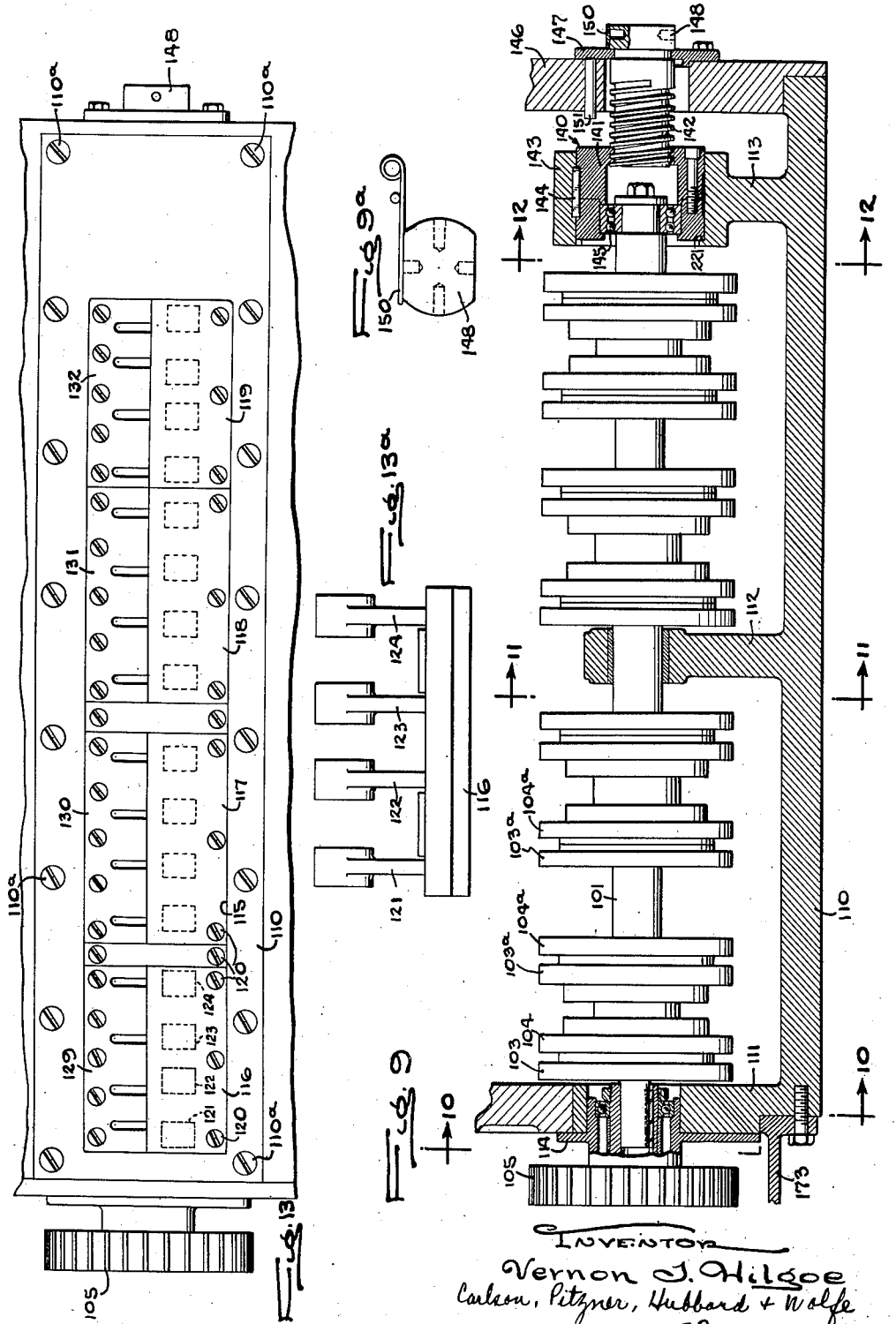

June 25, 1957  V. J. HILGOE  2,797,084
STRAIGHT AND COLLECT DELIVERY MECHANISM
Filed Oct. 19, 1953  11 Sheets-Sheet 7
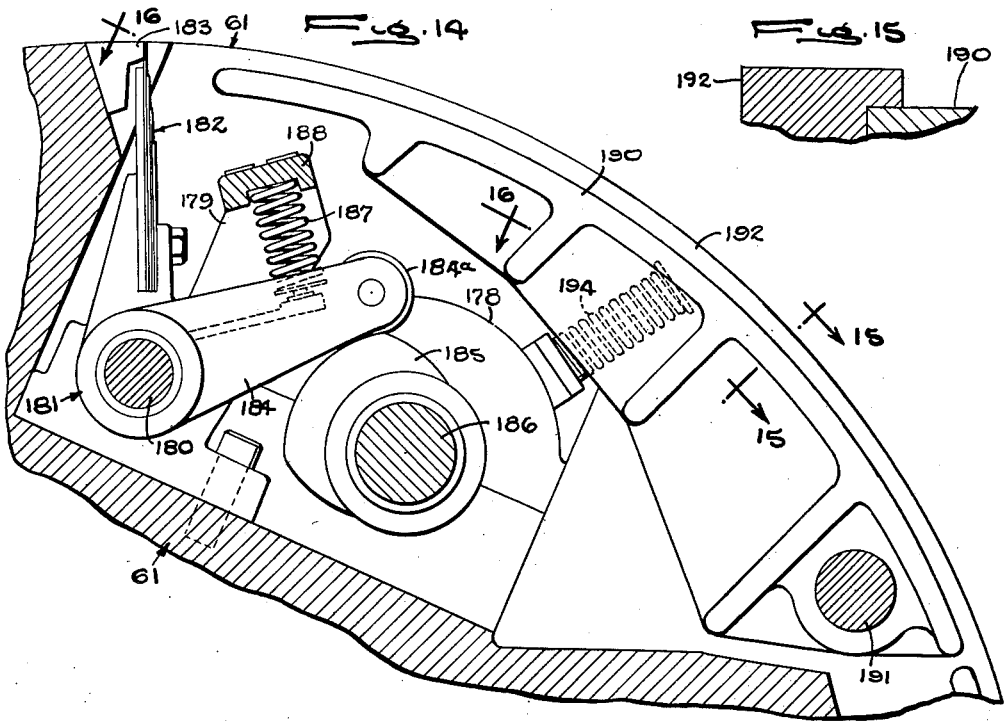
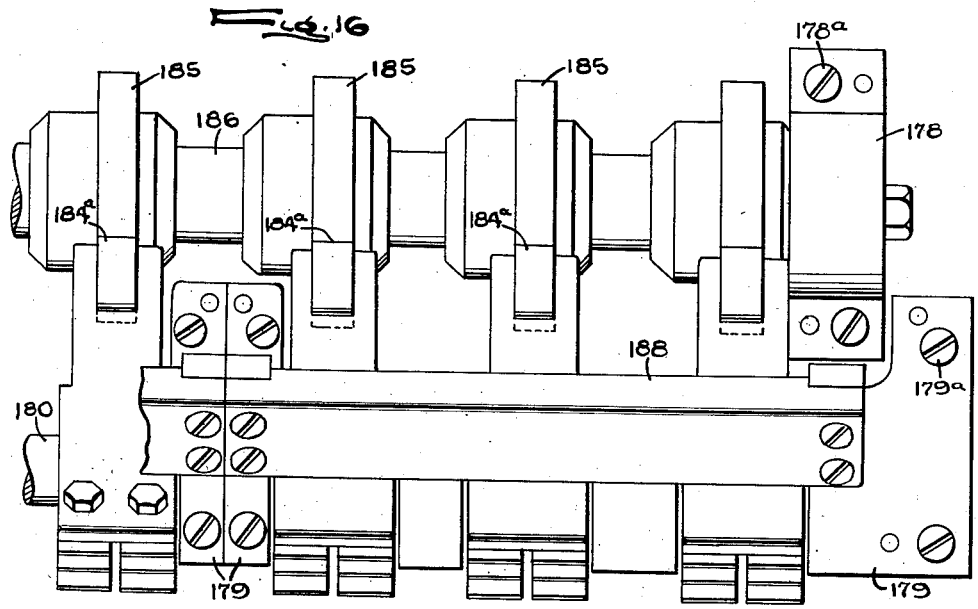

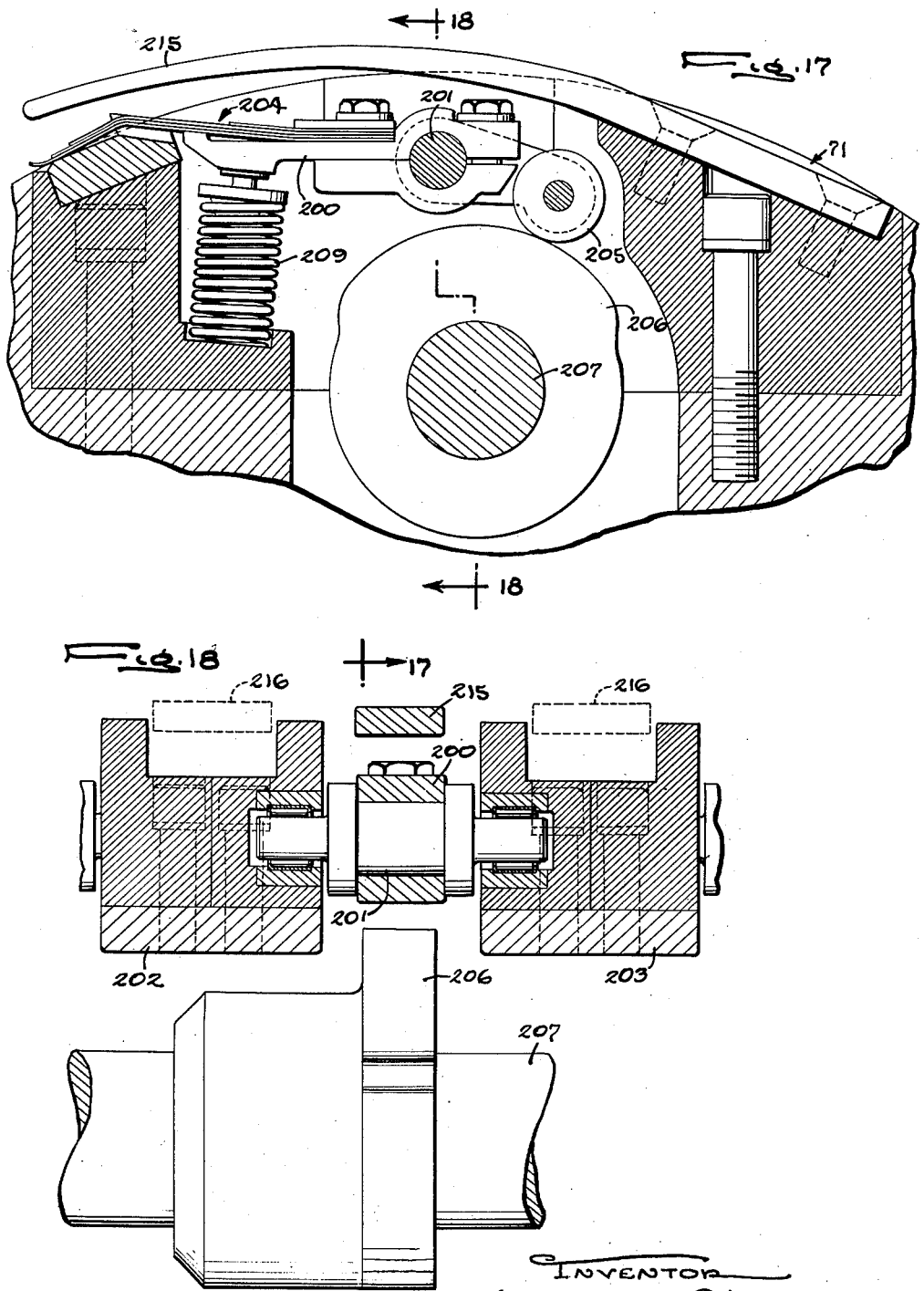

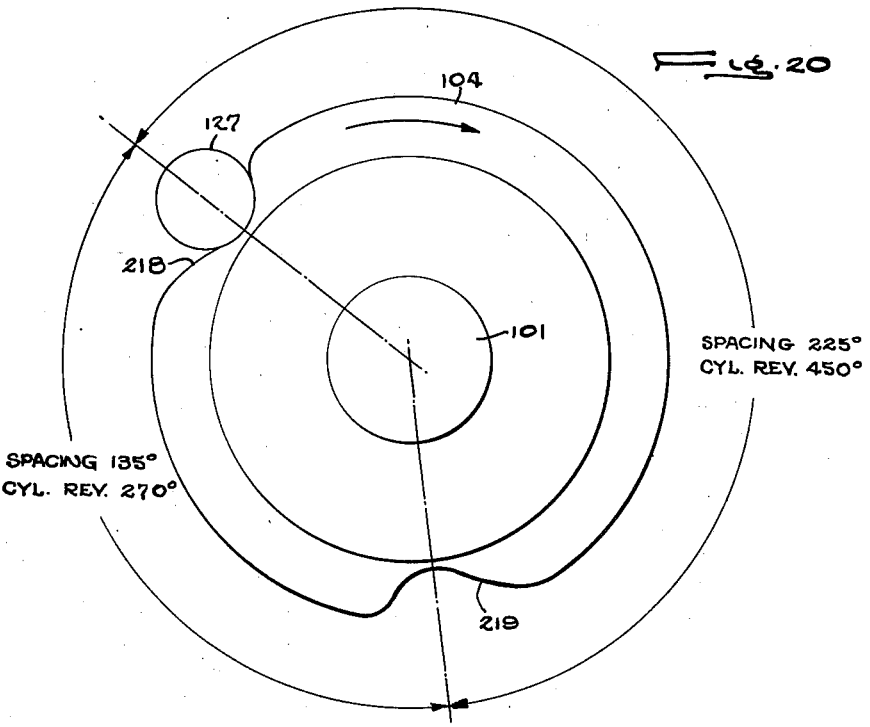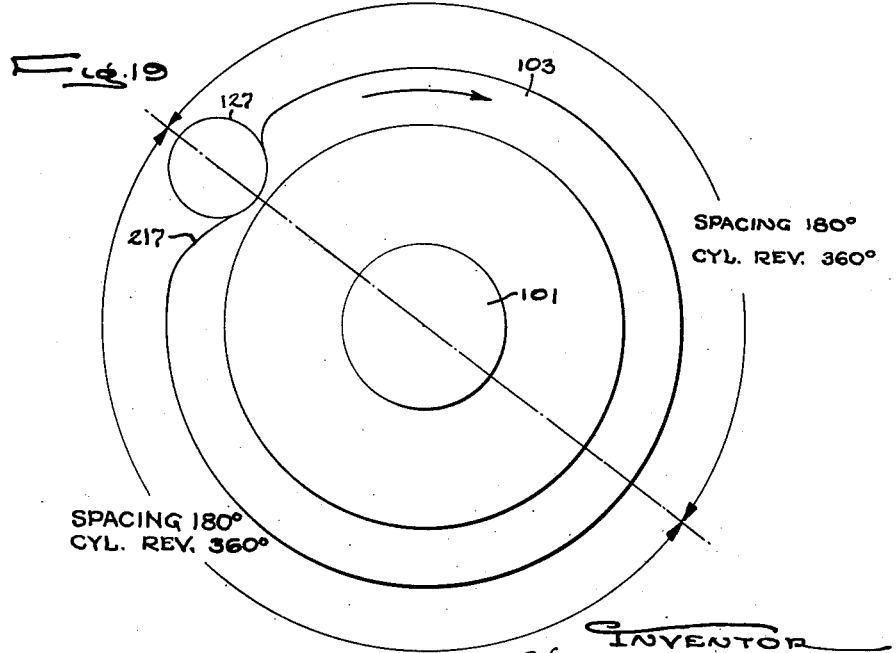

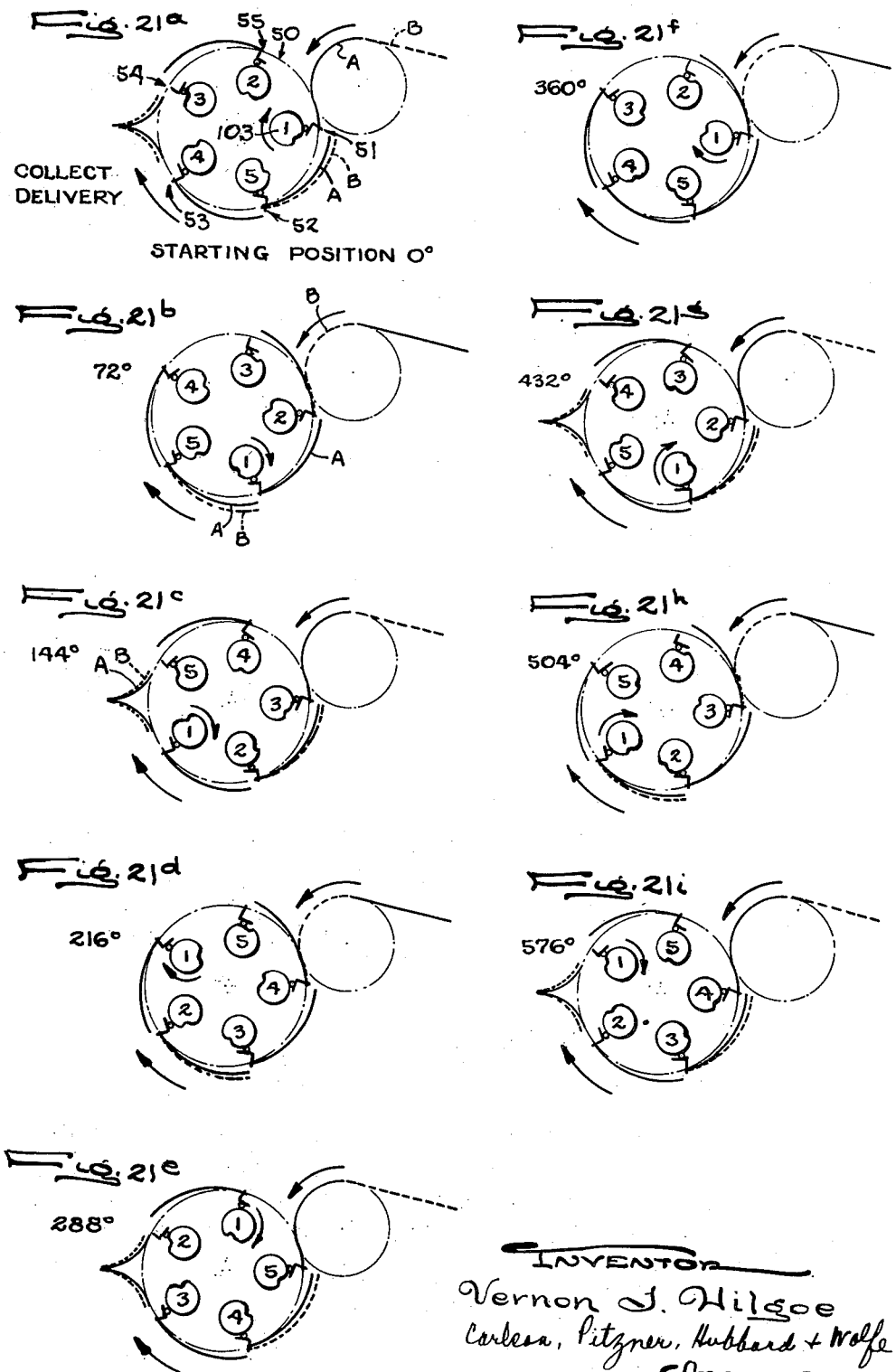

STRAIGHT DELIVERY
STARTING POSITION 0°

414°

126°

432°

144°

558°

270°

576°

288°

INVENTOR
Vernon J. Hilgoe
Carlson, Pitzner, Hubbard & Wolf
ATTORNEYS

United States Patent Office 2,797,084
Patented June 25, 1957

2,797,084

STRAIGHT AND COLLECT DELIVERY MECHANISM

Vernon J. Hilgoe, Lombard, Ill., assignor, by mesne assignments, to Miehle-Goss-Dexter, Incorporated, Wilmington, Del., a corporation of Delaware Application October 19, 1953, Serial No. 387,009

24 Claims. (Cl. 270—43)

The present invention relates to printing presses, and more particularly to an improvement in mechanism for transferring severed products at the delivery end.

The term "product handling mechanism" as used herein is intended to include the cyclically operating parts employed in the forwarding of severed web sections or products from one point to another in a delivery mechanism, the invention being suitable for operating pins, jaws or grippers.

It is an object of the present invention to provide an improved transfer mechanism which is capable of reliable operation at higher speeds than the transfer mechanisms in present use. It is a related object to provide a transfer mechanism which insures that the cyclical operations are timed with precision over a wide range of speed, up to a speed substantially beyond that available in modern presses intended for printing magazines and other high quality work. It is a further object related to the foregoing to provide a transfer mechanism in which cyclical stresses are reduced to a minimum and in which failure due to repeated stress or "fatigue" is substantially eliminated. It is another object to provide a product transfer mechanism which operates more smoothly with fewer unbalanced forces and hence with less vibration than conventional transfer mechanisms.

It is a further object to provide a transfer mechanism which is flexible in use and which may be easily converted from straight to collect delivery. It is also an object to provide a transfer mechanism in which the timing and other adjustments may be easily and quickly made with provision for adjusting all of the pins, jaws or grippers on a particular cylinder simultaneously and to exactly the same degree.

It is another object of the present invention to provide a transfer mechanism which is inherently durable and long-lived, but which is less expensive to manufacture than conventional devices. It is still another object to provide a transfer mechanism which employs a novel unit assembly and which is more easily assembled, serviced and maintained.

Other objects and advantages of the invention will be apparent upon reading the attached description and upon reference to the drawings, in which:

Fig. 2 is a transverse section taken through the female cutting cylinder and a portion of the collecting cylinder showing the mechanism for transferring the severed products.

Fig. 3 is an end view of the female cutting cylinder showing the sun and planet gear arrangement for driving the cam shafts.

Fig. 4 is a fragmentary section taken along the line 4—4 in Fig. 3.

Fig. 5 is an end view of the collecting cylinder in partial section.

Fig. 6 is a diagram showing the arrangement of gears in the collecting cylinder.

Fig. 7 is a fragmentary longitudinal section through one end of the collecting cylinder.

Fig. 8 is a perspective showing the shiftable cams and associated pin arms in the collecting cylinder.

Fig. 9 is a longitudinal section showing a cam shaft in the collecting cylinder and the associated shifting mechanism.

Fig. 9a is a detail of the spring detent used in Fig. 9.

Fig. 10 is a section taken along the line 10—10 in Fig. 9.

Fig. 11 is a section taken along the line 11—11 in Fig. 9.

Fig. 12 is a section taken along the line 12—12 in Fig. 9.

Fig. 13 shows the external appearance of the collecting cylinder along the line of exit of the pins.

Fig. 13a is an elevation of a typical pin arm supporting bracket.

Fig. 14 is a fragmentary transverse section of one of the jaw cylinders showing the jaw-operating mechanism.

Fig. 15 is a detail of the means for retaining the depressible cover plate of Fig. 14.

Fig. 16 is a top view of the mechanism shown in Fig. 14 looking along the line 16—16 in Fig. 14.

Fig. 17 is a fragmentary transverse section of one of the delivery cylinders showing the gripper-operating mechanism.

Fig. 18 is a transverse section taken along the line 18—18 of Fig. 17.

Fig. 19 shows the profile of a cam used for collect delivery.

Fig. 20 shows the profile of an associated cam used for straight delivery.

Figs. 21a–21i are a series of stop-motion views showing the phasing of the collecting cylinder and its operating cams during a two-revolution cycle during collect delivery.

The invention has been described herein in connection with a preferred embodiment; it will be understood, however, that I do not intend to limit the invention to such embodiment, but, on the contrary, intend to cover all modifications and alternative constructions which are included within the spirit and scope of the appended claims.

Figure 1:
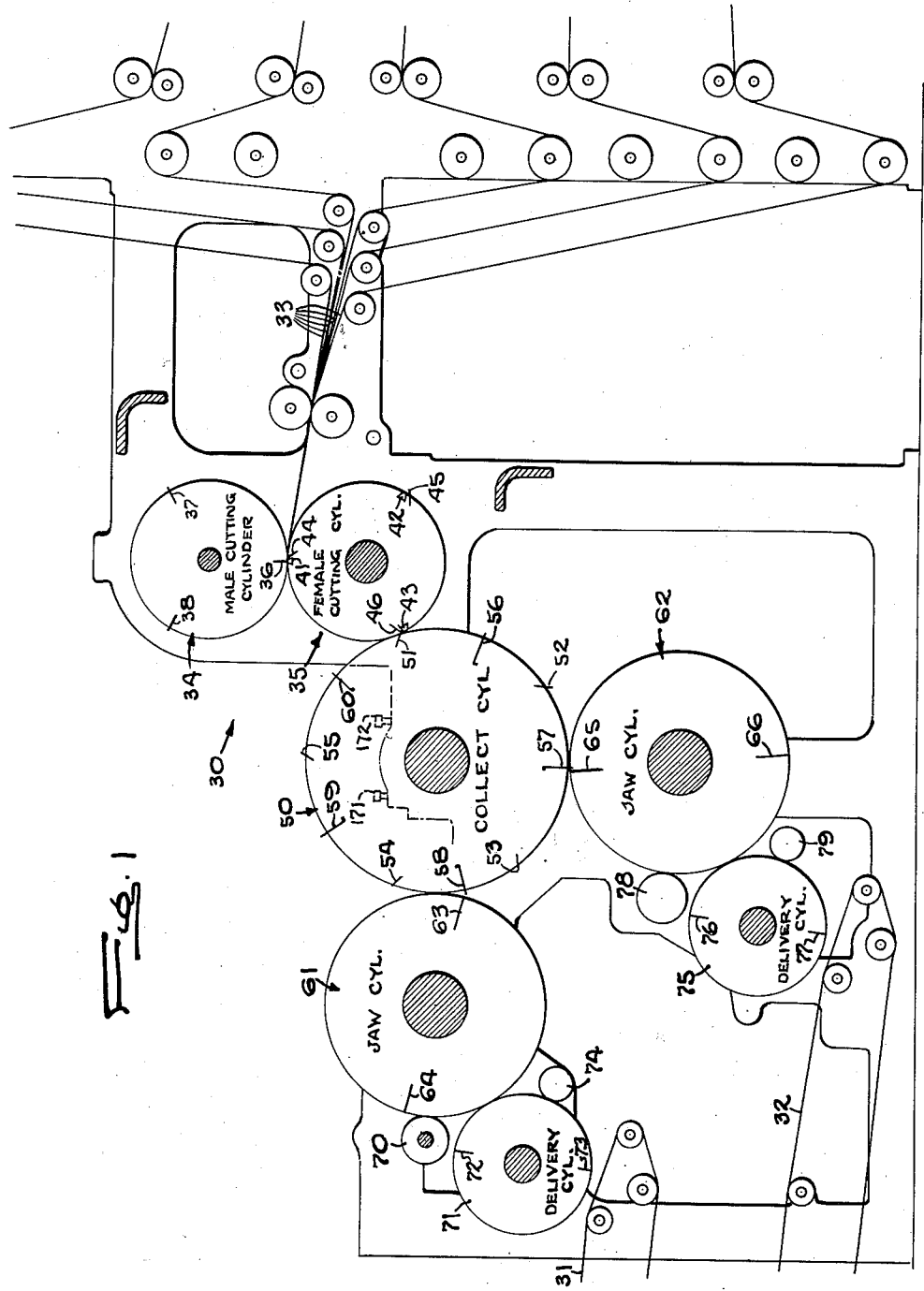
Figure 1 is a general side view of a delivery mechanism for a printing press to which the present invention has been applied.

Turning now to the drawings, Figure 1 shows a delivery mechanism 30 for cutting, folding and delivering signatures or products to two delivery belts 31, 32. At the right-hand or input end of the delivery mechanism are a set of six webs 33 which are associated with one another and fed between a male cutting cylinder 34 and a female cutting cylinder 35. Mounted on the cutting cylinder 34 are male knives 36—38 which register with cutting bars 41—43 on the female cylinder. As the products are severed they are picked up by sets of pins 44—46, respectively, on the latter cylinder.

From the cutting cylinders the severed products are passed to a collecting cylinder 50 having sets of pins 51—55 with interspaced folding blades 56—60. The collecting cylinder picks up the severed products and carries them around for delivery to two jaw cylinders 61, 62 having sets of jaws 63, 64 and 65, 66, respectively, into which the products are tucked. Associated with the jaw cylinder 61 is a timed feed pulley 70 which advances the products from the jaws to a delivery cylinder 71 having grippers 72, 73. A slitter 74 divides the products prior to deposit upon the delivery belt 31. Similarly, the products from the jaw cylinder 62 are delivered to a delivery cylinder 75 having grippers 76, 77, timed feeding being effected by a feed pulley 78. A slitter 79 divides the products before they are deposited upon the belt 32.

Usually all of the webs are printed with alternating products, thus, ABABAB, and, during "straight" delivery the transfer elements on the cylinders are timed so that all of the products A are deposited on the delivery belt 31 and all of the products B are deposited on the remaining delivery belt 32. During "collect" delivery, the cylinders feeding the delivery belt 32 are silenced and complete sets of products AB are collected on the collecting cylinder 50 and are transferred via the jaw cylinder 61 and delivery cylinder 71 to the delivery belt 31. Both the collect and straight delivery operations performed by the present device will be illustrated in some detail in the discussion which follows and are summed up in Figs. 21a–i and 22a–i. It will be understood that means are provided for driving all of the cylinders at "press speed," except that the delivery cylinders 71, 75 have a peripheral speed which is approximately 35% less than press speed in order to decelerate the products prior to delivery on the delivery belts.

In accordance with the present invention, novel means are provided for actuating the transfer elements on each of the cylinders, i. e., the pins, jaws and grippers which serve to pass the products along to the delivery belts. This improved transfer means includes a cam shaft for each of the sets of transfer elements having a plurality of cams spaced therealong and with all of the cam shafts in a particular cylinder being constantly driven by planetary gears which are in mesh with a stationary sun gear adjustably mounted on the frame of the press. The various transferring cylinders have somewhat different means for carrying out the foregoing, and reference will first be made to the pin-operating mechanisms employed in the female cutting cylinder 35, as shown in Figs. 2–4, inclusive.

Referring to Fig. 2, separate transfer mechanisms are shown in cross section at 81, 82, 83, respectively. The mechanism 81 will be taken by way of example and corresponding parts on the remaining mechanisms are correspondingly numbered. The transfer mechanism includes a series of pin arms arranged for rocking movement about a longitudinal axis. Only one of such pin arms is shown at 84 mounted for rotation about an axis 85. The pin arm 84 is generally U-shaped, carrying a pair of pins 86 at its outer end, only one of the pins being shown. For the purpose of moving the pins 86 relative to the surface of the cutting cylinder, an individual cam operator is provided which includes a cam 87 and a cam follower 88, the cam 87 being mounted on a rotating shaft 89. Mounted on the same shaft 89 are other cams 87a, 87b, etc. (see Fig. 4) which are similarly shaped and employed to operate individual pin arms similar to the pin arm 84. The pin arm 84 is biased into a retracted position by a biasing spring 90, which maintains the cam follower 88 in firm riding contact with the cam 87. It will be understood that each of the individual pin arms 84 has a separate biasing spring 90.

In carrying out the present invention a sun and planet gear arrangement shown in Fig. 3 is provided for rotating the cam shafts 89 at the same angular speed as the cylinder 35 and in the same direction. Thus, mounted at the ends of the shaft 89 are planetary gears 91 engaging a sun gear 92 mounted on the frame, all of the gears having the same diameter. Means are further provided for rotatively adjusting the sun gear relative to the frame of the machine, thereby to change the phasing of all of the cam shafts simultaneously. For this purpose the sun gear in the present instance is in the form of a ring shown in Fig. 4, and has an annular extension or sleeve 93 which is telescoped over the cylinder shaft 94. At its outer end the sleeve 93 has an annular flange 95, held captive by a guide member 96, which is clamped to the frame 97.

In order that the product may be picked up when it is severed and later released to the collecting cylinder, the cams 87 have a profile which includes a high region and a low region, as shown, each of the cams being so phased relative to the rotation of the cylinder that the pins are fully retracted at the time that the product is fully engaged by the pins on the collecting cylinder. The two extreme conditions are illustrated at the left-hand and top portions, respectively, of the cylinder 35 shown in Fig. 2. When it is desired to vary the timing slightly, the flange 95 on the sun gear is rotated in one direction or the other. For this purpose capstan holes 98 are provided for engagement by a suitable rod or tool.

Attention may next be given to the structure of the collecting cylinder 50, which is set forth in Figs. 5–13, inclusive. This cylinder is equipped with five sets of pins, as previously stated, together with interspaced folding blades which serve to tuck the successive products at the position of the fold into the jaws of the jaw cylinders, thereby folding each of the products into a booklet or signature. In accordance with the present invention, two different actuators are provided for each of the sets of pins on the collecting cylinder, together with means for shifting either one or the other of the actuators into active position thereby effectively changing the timing of the pin operations for straight or collect delivery. In the present embodiment, the actuators include separate cams having different profiles and which are selectively shifted into engagement with a single cam follower, rotation of the cams serving to operate the pins in the same general fashion as previously discussed in connection with the female cutting cylinder.

Referring to the drawings, the cam shafts 101, five in number, are symmetrically arranged about the cylinder shaft 102. Each of the cam shafts carries two sets of cams 103, 104 with similar cams on the same shaft being indicated by the same numeral (Fig. 9). At its outer end, each of the shafts 101 mounts a planetary gear 105, all of the planetary gears being in mesh with a sun gear 106, which is coupled to the frame of the machine by a series of gears to be later described. Turning now to the cam shaft 101 shown in Fig. 9, it will be seen that it is mounted on a longitudinal plate or bracket 110 having supporting posts 111, 112 and 113. Mounted on the supporting post 111 at the gear end of the shaft is a bearing plate 114, which is shown in face view in Fig. 10, the other two posts 112, 113 being shown in Figs. 11 and 12, respectively.

The longitudinal bracket 110 not only serves to mount the shaft 101, but also to mount all of the operating parts which are associated with such shaft. For this purpose, the bracket 110 has a long, rectangular opening 115 (Fig. 13) in which are received a series of bracket plates 116—119, held in place by suitable bolts 120. Extending inwardly from the inner surface of each of the bracket plates are finger supporting posts 121—124. Pivotally mounted between adjacent posts are pin levers, one of said levers being indicated at 125 in Figs. 2 and 8. These levers are L-shaped, carrying a pair of pins 126 at their outer ends. In one of the two conditions of operation, namely, collect, each of the pin levers is in alinement with a corresponding cam 103, and engages such cam through a cam follower 127, the cam follower being urged into contact with the cam by means of an individual biasing spring 128. In order to shield the pin-operating mechanism while permitting the pins to project beyond the surface of the cylinder, auxiliary cover plates 129—132 (Fig. 13) are provided which are bolted to the brackets 116—119, respectively, and which have comb-like slots through which movement of the pins takes place.

In carrying out the invention means are provided for manually shifting the cam shafts 101 axially to bring one or the other of the sets of cams 103, 104 into active engagement with the cam follower 127. The means for accomplishing this shifting movement is set forth in Fig. 9, where it will be noted that the shaft 101 has an axially movable mounting 140 at its right-hand end. Such movable mounting includes a slidable nut 141 and a manually rotatable screw 142, the nut being arranged for axial sliding movement in a sleeve 143. Keys 144 at the periphery of the nut restrict it to pure axial motion as the screw 142 is rotated. Movement of the nut is transmitted to the shaft 101 by a thrust bearing 145.

To restrain the screw 142 against axial movement, it is mounted in the end wall 146 of the cylinder, and is retained in position by means of a split retaining ring 147 which is received in an annular groove machined in the neck of the screw. The outer end of the screw is formed into a capstan 148 having spaced holes which may be engaged by a rod or suitable tool. The capstan 148 is flatted on two sides, as shown in Fig. 9a, and is engaged by a detent spring 150 to prevent the screw from rotating except when done intentionally. In a practical design, the screw thread is made rather coarse so that approximately three turns of the screw are required to move the shaft 101 from one of its extreme positions to the other, thereby shifting into active engagement the alternate set of cams. Stops such as that shown at 151 and 221 are provided in order to establish positive limits of movement.

As will be discussed, the cams 103, 104 in each set have high portions at the same level, even though they have different profiles. Prior to shifting from one set of cams to the other, therefore, the cylinder is rotated around into a reference point at which both cams present a surface to the associated cam follower which is at the same height. Since the space between cams 103, 104 is less than the width of cam follower 127, it follows that each of the cam shafts 101 may be shifted at such reference point without danger of sidewise jamming of the cam followers.

In accordance with one of the more detailed aspects of the present invention, means are provided for rotating all of the cam shafts 101 at a speed which is exactly half of the angular speed of the cylinder in which they are mounted, one of the sets of cams being provided with two dips or low portions and the other cam being provided with a single dip for straight and collect operation, respectively. In order more fully to understand the arrangement of gearing which is employed for causing all of the cam shafts 101 to rotate at half cylinder speed, reference is made to Figs. 5, 6 and 7, Fig. 6 being diagrammatic. As previously mentioned, each of the cam shafts 101 carries a planetary gear 105 engaging a sun gear 106. The latter gear is compounded to another gear 160, which is in turn coupled to a pair of compounded gears 161, 162. The gear 162 is in mesh with a sun gear 163, which is stationarily mounted on the frame 97.

Although stationary, the gear 163 is nevertheless adjustable with respect to the frame so as to vary the phasing of all of the cam shafts simultaneously. To adjust the gear 163, it is provided with an integral extension or sleeve 164 carrying a flange 165 at its outer end, the sleeve 164 being telescoped over the shaft 102 of the collecting cylinder. Bolted to the flange 165 and journaled in the frame is a rockable mounting member 166. Such mounting member has a pair of radially extending arms 167, 168, which are received in spacious recesses 169, 170, respectively, which extend radially into the frame. In order to rotate the mounting member 166 through limited range of rocking movement, the arms 167, 168 are engaged by adjusting screws 171, 172 screwed into the frame and arranged at right angles with respect to the arm (see Fig. 1). It will be apparent that by loosening one of the screws and tightening the other, the stationary gear 163 will be rotationally adjusted. All of the gears shown in Fig. 6 are covered by an oil-tight cover 173 so that the device presents a pleasing streamlined appearance, and to facilitate bathing the gears and their associated bearings in oil.

In the above paragraphs the construction of the mechanism in the collecting cylinder capable of producing both collect and straight delivery has been described without, however, specifically describing the shapes of the cams and the proper phasing for both types of delivery, which discussion will be reserved until the operation of the delivery mechanism as a whole is summarized. In going on to discussing the jaw cylinders and delivery cylinders next in line, it will, of course, be understood that the pins on the collecting cylinder are timingly retracted to release the severed product during operation of the jaws i. e., "fold off," on the appropriate jaw cylinder.

In describing the construction of the jaw cylinders 61, 62, the jaw cylinder 61 will be taken as representative, and reference is made to Figs. 14–16. There are two diametrically arranged sets of jaws 63 and 64, on each of the jaw cylinders. The first set of jaws includes a plurality of jaw arms freely mounted on a common shaft 180. Such arrangement employing a common shaft differs from that employed in the case of the pins discussed above, where separate stub shafts are employed for each of the arms. The arm 181 will be taken by way of example, the similar arms in series being designated by the same numeral. The arm 181 has a leaf spring jaw blade 182 which engages an abutment 183. The arm is generally V-shaped, having a cam follower portion 184, with a roller 184a in engagement with a cam 185, all of the similar cams being mounted on a cam shaft 186 for simultaneous rotation. For the purpose of urging the cam follower 184 into engagement with the cam 185, an individual biasing spring 187 is provided, a plurality of such springs being supported at their outer ends on a spring-supported bar 188.

It will be understood that means are provided for rotating the cam shaft 186 at the same speed and in the same direction as the jaw cylinder. Such means preferably consists of a sun and planet gear arrangement similar to that shown in Fig. 3, but with only two planetary gears for driving the two cam shafts. The cooperating sun gear may be mounted in the frame in exactly the same fashion as in the case of the collecting cylinder (Fig. 7) and with a pair of adjusting screws for the purpose of adjusting the phasing of the cam shafts.

For the purpose of covering the jaw mechanism while permitting yielding movement in response to a jam-up of products, an arcuate cover plate 190 is used which is pivoted to a longitudinally extending shaft 191. The plate 190 is prevented against outward movement beyond the position shown and in response to centrifugal force by means of arcuate retainers 192, which are bolted to the cylinder and which are grooved out to overlie the lateral edges of the plate 190. Such retainers are shown in cross section in Fig. 15. Support at the ends of the plate is adequate to resist centrifugal forces, since the plate is strongly ribbed along its length. In order to keep the plate outwardly biased in normal position, a spring 194 is used. It will be apparent that jam-up of the products at the jaw cylinder, regardless of cause, will simply produce resilient retreating of the plate 190, which will avoid damage to the cylinder until the situation can be corrected by the press operator.

From the jaw cylinders, the products pass to the delivery cylinders 71, 75 respectively. Such delivery cylinders receive the folded products from the respective jaw cylinders, gripping each product at the fold by alined sets of grippers. In order to understand the construction and operation of the grippers, reference is made to Figs. 17 and 18, which show one of the gripper mechanisms on the delivery cylinder 71. One of the gripper arms 200 will be taken as representative, each gripper arm having a cam follower portion 201, which is supported in needle bearings on spaced pedestals 202, 203. The gripper arm 200 includes a leaf spring gripping portion 204, the tip of which presses more or less flatly against the surface of the cylinder. At its opposite end, the portion 201 has a cam follower roller 205 which engages a cam 206 mounted on a cam shaft 207. The cam and follower are kept in engagement by a biasing spring 209. The two portions of the gripper assemblies 200 and 201 are adjustable with respect to one another, as shown. It will be understood that a plurality of similar cams are mounted at spaced points along the cam shaft 207 for operating individul gripper assemblies.

Since the product must be released from the jaws of the folding cylinder prior to transfer to the delivery cylinder, it is necessary to provide means for advancing the product at jaw cylinder velocity after it is released. Due to the action of the timed feed pulley, which is conventional, each of the products is timingly fed to the grippers on the delivery cylinder. It will be understood that means are provided for rotating the cam shaft 207 in unison with the rotation of the cylinder, so that the grippers in a given set are all simultaneously opened to receive a folded product from the associated jaw cylinder. In order to prevent the gripper arm 204 from striking against previously deposited signatures on the delivery belt, a guard 215 is provided which is in the form of a polished, chrome-plated strip. This guard performs the additional function of spacing out the products on the delivery belt.

The gear arrangement employed for operating the cam shafts on the delivery cylinders is completely analogous to that employed in the other cylinders discussed above. It will therefore suffice to say that on each of the cam shafts 207 is a planetary gear which runs in mesh with a stationary sun gear, the latter being adjustable through a limited range to vary the timing of the cam shafts. If desired, strippers indicated dot-dash at 216 may be provided for stripping the products from the delivery cylinder for depositing on the belt. The use of such strippers is, however, conventional, and need not be discussed. The delivery cylinders are driven at approximately 35% slowdown in order partially to decelerate the severed products, further deceleration taking place as the products are deposited on the delivery belt.

With the complete structure in mind, attention may next be given to a typical operating cycle for collect delivery in which all of the products are deposited on the same delivery belt 31 with the remaining delivery belt and its associated cylinders being silenced. Such cycle is shown in Figs. 21a–21i, inclusive, which show the angular position of the collecting cylinder, starting from an arbitrary point at intervals of one-fifth revolution, or 72°, and with the cylinder rotating in a clockwise direction. These figures show the phasing of each of the pin-operating cams 103 at each step, it being understood that such cams rotate at half the speed of the collecting cylinder.

In order to distinguish between successive unlike products, the products A are indicated by a full line, and the products B by a dashed line. The sequence will be clear if the condition at the starting point shown in Fig. 21a is clearly in mind. Here it will be noted that a product A is being picked up by a set of pins 51. The set of pins 52 has already acquired a complete set of products and is on its way to feed them to the jaw cylinder. The set of pins 53 has a product A and will retain such product until a product B is added during the subsequent revolution. The set of pins 54 has just been completely retracted to deliver a complete set of products AB to the jaw cylinder. Finally, the set of pins 55, with the product A attached, is about to pick up a product B to complete the set. In the cylinder position shown in Fig. 21b, no products are forwarded to the jaw cylinder. In the next cylinder position, however, shown in Fig. 21c, a complete set of products AB is forwarded to the jaw cylinder. Subsequently, as will be apparent from the succeeding Figs. 21d–21i, a complete set of products is forwarded to the jaw cylinder every 144° of rotation of the collecting cylinder.

Confining attention to a single one of the cams 103, it will be noted that such cam operates to retract the associated pins only once during each two revolutions of the collecting cylinder. Thus, starting with an empty set of pins, a product A is picked up from the female cutting cylinder, the pins on the female cutting cylinder being suitably retracted to permit pick-up. The cylinder then makes a complete revolution, retaining a product A, and a product B is added during the second revolution. During the second revolution the combined products AB from the particular set of pins are passed to the jaw cylinder.

For straight delivery, all of the cam shafts are shifted endwise by the mechanism shown in Fig. 9 to move the alternate cam 104 into engagement with the cam follower controlling the pins. The profile of the cam 104 is shown in Fig. 20, where it will be noted that the cam has two dips 218, 219. The first of the dips 218 has a position which corresponds exactly with the dip 217 on the cam 103. The second dip is spaced at 135° from the first. The reason for this is that the cylinder itself must rotate 270° between the time that product A is released and the time that the succeeding product B is released; thus, the cam which controls the release must rotate half this amount, or 135°.

Figure 22A:
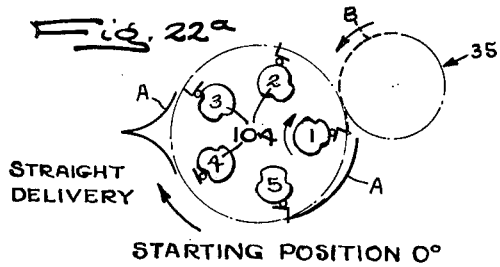
Figs. 22a–22i are a series of stop-motion views showing the phasing of the collecting cylinder and the operating cams during a two-revolution cycle for straight delivery.
Figure 22F:
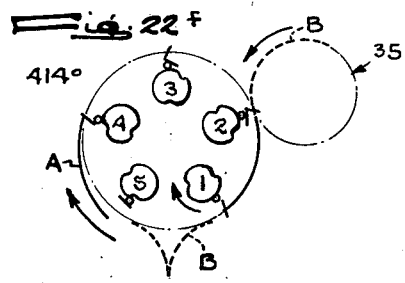
Figure 22B:
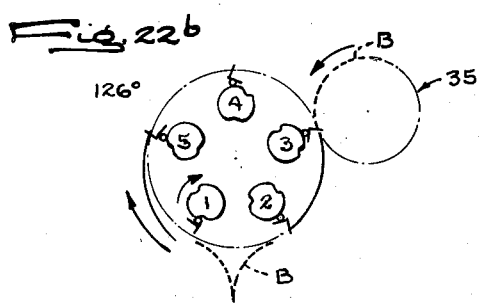
Figure 22G:
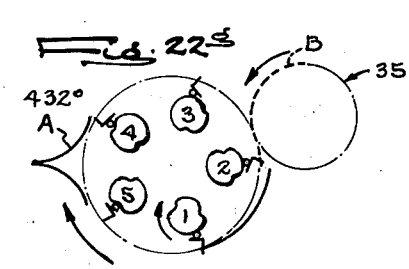
Figure 22C:
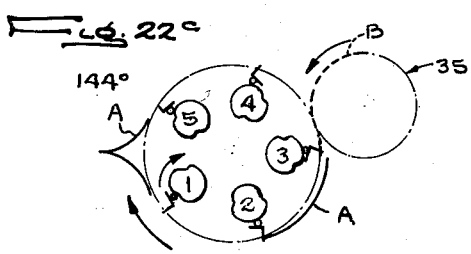
Figure 22H:
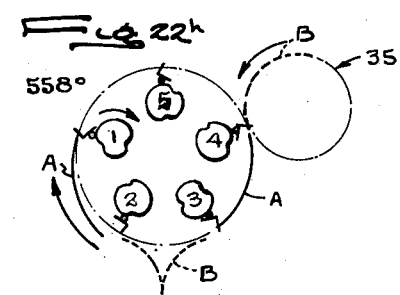
Figure 22D:
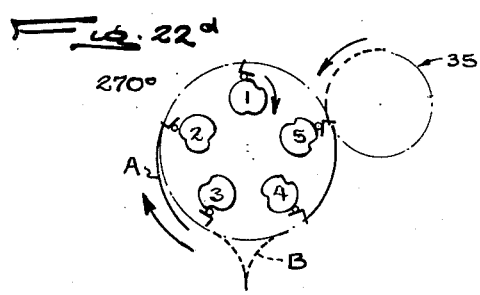
Figure 22I:
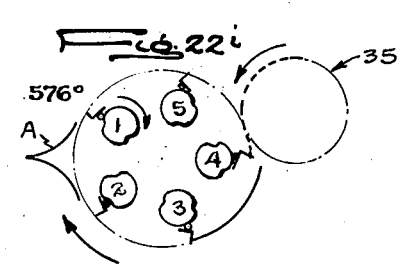
Figure 22E:
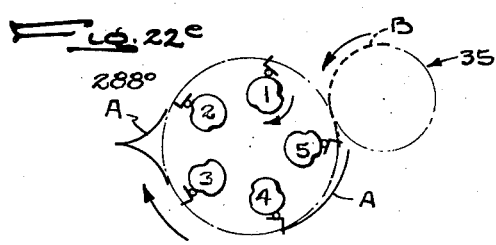

In order to understand the sequence that takes place during straight delivery, reference is made to the stop-motion views shown in Figs. 22a–22i, inclusive. These views are not taken at equal intervals of 72° of cylinder rotation, as in Fig. 21a. Instead, the views show the successive release of products A and B, together with the phasing of the cams at the instant that the release takes place. The point of release of product A, shown in Fig. 22a, is taken as a reference. Release of the succeeding product B is illustrated in Fig. 22b, the cylinder having rotated 126°. Passage of the second product A is shown in Fig. 22c, the cylinder having rotated 144°. Such process is continued, as shown in the succeeding views, until a total of five products A and five products B have been handled, thus completing a single two-revolution cycle of the cylinder. The last step in the cycle, namely, the transfer of a product B at the 720° point, has been omitted from the drawing. After the cylinder has rotated 720° the cycle is complete.

Turning to one of the more detailed features of the present device, it will be noted that each of the cam shafts and its associated set of cam followers and transfer elements is made as a sub-assembly which can be bodily removed from the cylinder for bench work. In the case of the female cutting cylinder, all of the parts are mounted on a longitudinal sub-frame 220, which is received in a slot milled in the body of the cylinder, the sub-assembly being held in place by means of bolts 220a. In the case of the collecting cylinder an individual cam shaft and all of its associated parts are mounted on a longitudinal bracket 110, which is bolted in place on the cylinder by means of bolts 110a. The pin arms which cooperate with the cams in the collecting cylinder are mounted on brackets 116 (see Fig. 13) which are in turn secured to the main longitudinal bracket 110. Thus, upon removing the bracket 110, the planetary gear 105 is disengaged from the sun gear, and the entire assembly remains intact and may be serviced or adjusted on the bench. If desired, each cam assembly may consist of two units as in the case of the jaw cylinder, the construction of which is set forth in Figs. 14–16. Here it will be noted that the cam shaft is mounted on a bracket 178, while the shaft 180, which supports the cam followers, is mounted on an adjacent bracket 179, the brackets being secured by bolts 178a, 179a, respectively. The brackets 178, 179 may be accurately located with respect to one another by suitable locating pins.

The structure described above employing longitudinal cam shafts having a series of cams and separate cam followers for the individual transfer elements, may be operated at speeds greatly in excess of the speeds currently employed in printing presses intended for high quality work. Present-day mechanisms, employing a single outboard cam for operating a plurality of transfer elements, are generally limited to web speeds on the order of 1000 feet per minute. By contrast, the present arrangement may be operated at web speeds in excess of 2000 feet per minute and with greatly extended life.

My observations show that the improvement in operation is due to a number of factors which are inherent in the construction. One of them is the elimination of cyclical stress and the avoidance of peak values of stress in the longitudinal operating shaft. It will be appreciated that in conventional arrangements the shafts for operating the handling mechanisms are called upon to oscillate back and forth at a high rate of speed while subjected to high torsional stress resulting in fatigue failure. Nor is it possible to reduce this stress by substantially increasing the shaft diameter, since this simply produces a corresponding increase in the mass which must be oscillated, resulting in still higher inertia forces so that any increase is largely self-defeating. In the present device the cam shafts are not oscillated but are constantly rotated with the cylinder, which not only eliminates the basic cause of fatigue but enables the shafts to be made as large as required independent of inertia considerations. Furthermore, energy is not required from the shaft at high torque but is instead taken at a gradual rate so that sharp peaks of torque are eliminated. It is true that the loading on each cam shaft, and hence the loading on the associated planetary gears, varies at a cyclical rate since a certain amount of energy is required to actuate the cam followers and compress the return spring. However, since the inertia of all oscillated parts is negligible and since there is no necessity for abrupt discontinuities on the cam surfaces, cyclical variation in load is reduced to a point where it may be disregarded.

As a result of the foregoing, twisting of the shafts is completely overcome, which insures that all of the transfer elements on a given shaft will act in unison and with a degree of precision not previously attained in this art. In order to insure that the cams are identically positioned on the cam shaft, they are preferably generated by precision duplicating machinery after cutting the keyway and using the keyway as a reference. With the cams in alinement, the phasing of the cams in a particular cylinder may be adjusted simultaneously to the same degree simply by rotating the sun gear which drives all of them. In the case of the collecting cylinder, shifting between the straight and collect modes of operation may be accomplished in a few minutes simply by turning the capstans 143 at the ends of each of the cam shafts through approximately three revolutions. Assuming that identical parts are automatically duplicated, a delivery mechanism employing the present invention may be constructed at low cost.

In the past the speed of the delivery mechanism has been one of the limiting features in the design speed of the press as a whole. Since there appears to be no absolute top limit of speed at which the present delivery mechanism may be operated, this limitation is removed and the design speed may be increased accordingly. This makes it possible to utilize to the full recent technological improvements in the web feeding, printing and drying portions of the printing press. While the improved delivery mechanism is primarily intended for use with magazine presses or other presses intended for printing high quality work, it will be apparent that it is not limited thereto and may be used in combination with newspaper presses, which are generally operated at speeds much greater than used in magazine presses.

Because of the unit or sub-assembly construction, a single sub-assembly may be removed for service simply by unscrewing a series of bolts and withdrawing the sub-assembly radially from the cylinder. And as one of the more detailed features of the present construction, all of the driving elements are located within a single oil-tight cover, thereby insuring more perfect lubrication than has been possible in previous designs.

In the above discussion of the collecting cylinder 50, shown in fragmentary section in Fig. 7, it was stated that the sun gear 163 thereon could be rotated through a limited angle of adjustment to adjust the phasing of the retracting movement of the pins. It will be appreciated by one skilled in the art that the sun gear 163 need not be limited to a narrow angle of adjustment, but may be adjustable through a broader range without departing from the invention. For example, the adjusting means indicated at 95—98 in Fig. 4, which permits a wide range of adjustment, may be substituted for the adjusting means 171, 172 in Fig. 7. With such wide range of adjustment available, it is a simple matter, when desired, to position the sun gear 163 so that release of the products during a collect run occurs at the jaw cylinder 62 rather than at the jaw cylinder 61.

I claim as my invention:

1. In a mechanism for forwarding signatures at the delivery end of a printing press, the combination comprising a cylinder, a series of signature-forwarding elements longitudinally spaced along the surface of the cylinder and individually mounted for independent rocking movement relative thereto, a cam shaft extending longitudinally in said cylinder adjacent said signature-forwarding elements and having a series of cams spaced therealong, said signature-forwarding elements having cam followers riding upon said cams respectively, and means for continuously and unidirectionally rotating said cam shaft in step with rotation of the cylinder.

2. In a mechanism for forwarding signatures at the delivery end of a printing press, the combination comprising a cylinder, a series of signature-forwarding elements longitudinally spaced along the surface of the cylinder and individually mounted for independent rocking movement relative thereto between a signature-engaging condition and a signature-releasing condition, an operating shaft extending longitudinally in said cylinder adjacent said signature-forwarding elements and having a series of actuators spaced therealong coupled to said signature-forwarding elements, and rotatable driving means carried by said cylinder for constantly and unidirectionally rotating said cam shaft in step with rotation of the cylinder, said actuators being so constructed and arranged that the signature-forwarding elements are moved between their limit positions cyclically for pickup and release of signatures at predetermined points respectively about the periphery of the cylinder.

3. In a mechanism for forwarding signatures at the delivery end of a printing press, the combination comprising a cylinder, a series of signature-forwarding elements longitudinally spaced along the surface of the cylinder and individually mounted for independent movement between a signature-engaging and a signature-releasing position, a cam shaft extending longitudinally in said cylinder adjacent said signature-forwardly elements and having a series of cams spaced therealong, said signature-forwarding elements having cam followers riding upon said cams respectively for movement between said positions, and means for constantly and unidirectionally rotating said cam shaft in timed relation with said cylinder for pickup of a signature at one point about the periphery of the cylinder and for release of the signature at a predetermined second point.

4. In a mechanism for forwarding signatures at the delivery end of a printing press, the combination comprising a frame, a cylinder journaled in said frame and having a longitudinal groove formed therein, subframe means removably mounted in said groove, a series of signature-forwarding elements, means for individually mounting said signature-forwarding elements in said subframe means for independent movement of the elements between a signature-engaging position and a signature-releasing position, a cam shaft extending longitudinally in said subframe and having a series of cams spaced therealong, said signature-forwarding elements having individual cam followers riding upon said cams respectively, and rotatable driving means coupled to said frame for continuously rotating the cam shaft in step with rotation of the cylinder.

5. In a mechanism for forwarding signatures at the delivery end of a printing press, the combination comprising a frame, a cylinder journaled in said frame and having a longitudinal groove formed therein, a subframe seated lengthwise in said groove and removably secured therein, a series of signature-forwarding elements individually mounted in said subframe for independent but simultaneous movement between a signature-engaging position and a signature-releasing position, a cam shaft extending longitudinally in said subframe and having a series of cams spaced therealong, said signature-forwarding elements having individual cam followers riding upon said cams respectively, and means including a sun and planet gear arrangement coupled to the frame for continuously and unidirectionally rotating the cam shaft in step with rotation of the cylinder.

6. In a mechanism for forwarding signatures at the delivery end of a printing press, the combination comprising a frame, a cylinder mounted in said frame, rows of signature-forwarding elements spaced longitudinally along the surface of the cylinder with the rows located at equal intervals about the periphery of the cylinder, said signature-forwarding elements having cam followers and being individually mounted for independent limited rocking movement about an axis parallel to the cylinder axis, cam shafts extending longitudinally in said cylinder adjacent said rows of signature-forwarding elements respectively, each of said cam shafts having spaced cam surfaces thereon for engaging said cam followers, planetary driving gears for said shafts arranged at the end of the cylinder and symmetrically disposed about the cylinder axis, a sun gear mounted on said frame coaxially with respect to the cylinder and engaging all of said cam shaft gears for continuously and unidirectionally rotating the same when the cylinder is drivingly rotated, and means interposed between said frame and said sun gear for permitting phasing adjustment of the sun gear about the cylinder axis.

7. In a mechanism for forwarding signatures at the delivery end of a printing press, the combination comprising a frame, a cylinder mounted in said frame, a row of signature-forwarding elements spaced longitudinally along the surface of the cylinder, said signature-forwarding elements having cam followers and being individually mounted for independent limited rocking movement about an axis parallel to the cylinder axis, a cam shaft extending longitudinally in said cylinder adjacent said row of signature-forwarding elements, said cam shaft having spaced cam surfaces thereon for engaging said cam followers, a planetary driving gear fixed to the end of said cam shaft at the end of the cylinder, a sun gear mounted on said frame coaxially with respect to the cylinder and engaging said cam shaft gear for continuously and unidirectionally rotating the same when the cylinder is drivingly rotated, and means interposed between said frame and said sun gear for permitting phasing adjustment of the sun gear about the cylinder axis.

8. In a mechanism for forwarding signatures at the delivery end of a printing press, the combination comprising a frame, a cylinder mounted in said frame, rows of signature-forwarding elements spaced longitudinally along the surface of the cylinder with the rows arranged equidistant about the periphery of the cylinder, said signature-forwarding elements having cam followers and being individually mounted for independent limited rocking movement about an axis parallel to the cylinder axis, cam shafts extending longitudinally in said cylinder adjacent said rows of signature-forwarding elements respectively, each of said cam shafts having spaced cam surfaces thereon for engaging said cam followers, a first sun gear mounted on said frame coaxially with respect to the cylinder, a second sun gear coaxially mounted in said cylinder, planetary gears on said cam shafts symmetrically disposed about the cylinder axis and meshing with said second sun gear, and a set of speed reduction gears mounted on said cylinder and in mesh with said sun gears so that the cam shafts rotate continuously and unidirectionally during rotation of the cylinder at a speed which is integrally related thereto.

9. In a mechanism for forwarding signatures at the delivery end of a printing press, the combination comprising a frame, a cylinder mounted in said frame, rows of signature-forwarding elements spaced longitudinally along the surface of the cylinder with the rows spaced from one another about the periphery of the cylinder, said signature-forwarding elements having cam followers and being individually mounted for independent movement thereby between a signature-engaging position and a signature-releasing position, cam shafts extending longitudinally in said cylinder radially spaced from the cylinder axis and adjacent said rows of signature-forwarding elements respectively, each of said cam shafts having spaced cam surfaces thereon for engaging said cam followers, a sun gear mounted on said frame coaxially with respect to the cylinder, planetary gears on said cam shafts symmetrically disposed about the cylinder axis and drivingly coupled to said sun gear for rotation continuously and unidirectionally in step with said cylinder at a speed which is integrally related to the speed of the cylinder.

10. In a mechanism for forwarding signatures at the delivery end of a printing press, the combination comprising a frame, a cylinder having a drive shaft journaled in said frame, rows of signature-forwarding elements spaced about the periphery of the cylinder, said signature-forwarding elements having cam followers for operating the same, cam shafts extending longitudinally in said cylinder adjacent said rows of signature-forwarding elements respectively, each of said cam shafts having spaced cam surfaces thereon for engaging said cam followers and for moving them between signature-engaging and signature releasing positions, planetary driving gears for said shafts arranged at the end of the cylinder and equidistant from the cylinder axis, and a sun gear meshing with all of said cam shaft gears, said sun gear being of ring construction and having an annular supporting sleeve telescoped over said drive shaft and fixed to said frame.

11. In a mechanism for forwarding signatures at the delivery end of a printing press, the combination comprising a frame, a cylinder having a drive shaft journaled in said frame, a row of signature-forwarding elements spaced longitudinally along the surface of the cylinder, said signature-forwarding elements having cam followers for operating the same, a cam shaft extending longitudinally in said cylinder adjacent said row of signature-forwarding elements, said cam shaft having spaced cam surfaces thereon for engaging said cam followers, a planetary driving gear for said shaft arranged at the end of the cylinder, and a sun gear on said frame, said sun gear being of ring formation and mounted on said frame concentrically with said drive shaft and in mesh with said cam shaft gear for driving said cam shaft gear in step with rotation of the cylinder, said sun gear having an adjustable mount for enabling limited rocking adjustment relative to said frame.

12. In a mechanism for forwarding signatures at the delivery end of a printing press, comprising a frame, a cylinder having a drive shaft journaled in said frame, rows of signature-forwarding elements spaced longitudinally along the surface of the cylinder and with the rows spaced from one another about the periphery of the cylinder, said signature-forwarding elements having cam followers for operating the same, cam shafts extending longitudinally in said cylinder adjacent said rows of product-handling elements respectively, each of said cam shafts having spaced cam surfaces thereon for engaging said cam followers, planetary driving gears for said shafts arranged in a common plane at the end of the cylinder and symmetrically disposed about the cylinder axis, a sun gear meshing with all of said cam shaft gears for driving the same continuously and unidirectionally, said sun gear having an annular sleeve telescoped over said drive shaft and adjustably fixed to said frame, said cylinder having an annular oil enclosure sealed to the end of the cylinder for enclosing all of said gears and having a rotary sealed connection with said sleeve.

13. In a mechanism for forwarding signatures at the delivery end of a printing press, comprising a frame, a cylinder having a drive shaft journaled in said frame, a row of signature-forwarding elements spaced longitudinally along the surface of the cylinder, said signature-forwarding elements having cam followers for operating the same, a cam shaft extending longitudinally in said cylinder adjacent said row of signature-forwarding elements and having spaced cam surfaces thereon for engaging said cam followers, a planetary driving gear fixed to said cam shaft at the end of the cylinder, a sun gear meshing with said cam shaft gear for driving the same continuously and unidirectionally, said sun gear having an annular sleeve telescoped over said drive shaft and coupled to said frame, said cylinder having an annular oil enclosure encircling said sleeve and sealed to the end of the cylinder for enclosing all of said gears.

14. In a mechanism for forwarding signatures at the delivery end of a printing press, a cylinder, a series of signature-forwarding elements longitudinally spaced along the surface of the cylinder and mounted for rocking movement about a longitudinal axis, a cam shaft extending longitudinally adjacent said product-handling elements, first and second sets of cams mounted on said cam shaft, with the cams of one set being interspaced with the cams of the remaining set so as to provide alternate cams for each of said signature-forwarding elements, cam followers on said signature-forwarding elements, means for axially shifting the cam shaft between a first position in which the cam followers are engaged with the first set of cams and a second position in which said cam followers are engaged with the second set of cams, and means for rotating said cam shaft in step with driving rotation of said cylinder and at a speed integrally related to the speed of the cylinder, said sets of cams being respectively profiled to produce different timing of the associated forwarding elements.

15. In a mechanism for forwarding signatures at the delivery end of a printing press, the combination comprising a cylinder, a series of pickup-and-release elements for picking up and releasing a signature at respective spaced points about the cylinder periphery, an operating shaft extending longitudinally in said cylinder adjacent the pickup-and-release elements, means for continuously rotating the shaft in step with rotation of the cylinder, said pickup-and-release elements having first and second sets of actuators coupled to said shaft, and means for selectively shifting the first set of actuators into an operating position in which the first set of actuators is connected to said pickup-and-release elements and for alternatively shifting the second set of actuators into an operating position in which the second set of actuators are connected to said elements, said actuators being so constructed and arranged as to produce unlike cycles of pickup and release.

16. In a mechanism for forwarding signatures at the delivery end of a printing press, the combination comprising a cylinder, a series of signature-forwarding elements for picking up and releasing a severed product at respective spaced points about the cylinder periphery, each of said signature-forwarding elements having a cam follower, a drive shaft arranged adjacent and parallel to said signature-forwarding elements and having two sets of cams, rotatable drive means for rotating the drive shaft at a rate which is integrally related to the rotation of the cylinder, each of said sets of cams having a characteristic profile, and means for relatively shifting the desired set of cams into engagement with the respective cam followers to produce alternative timing programs for the signature-forwarding elements.

17. In a mechanism for forwarding signatures at the delivery end of a printing press, a cylinder having a series of signature-forwarding elements arranged in longitudinal series thereon, a drive shaft extending longitudinally in said cylinder adjacent said signature-forwarding elements, means for continuously driving said drive shaft in step with driving rotation of said cylinder and at a speed which is integrally related thereto, a first driving connection shiftable into active position between said drive shaft and said signature-forwarding elements for causing said forwarding elements to pick up successive signatures at a pickup station and to release them at a first releasing station, a second drive connection shiftable into active position between said drive shaft and said signature-forwarding elements for causing said forwarding elements to pick up successive signatures at a pickup station and to release them alternately at (1) said first releasing station, and (2) a second releasing station, and manually operable shifting means for alternative shifting of said drive connections into active position.

18. In a mechanism for handling severed products at the delivery end of a printing press, a cylinder having a series of product-handling elements arranged in a longitudinal series thereon, a drive shaft extending longitudinally in said cylinder adjacent said product-handling elements, means for driving said drive shaft in step with driving rotation of said cylinder and at a speed which is integrally related thereto, a first driving connection shiftable between said drive shaft and said product-handling elements for operating such elements at a predetermined point in the rotation of the cylinder for causing delivery of a severed product at a first point about the periphery thereof, a second drive connection shiftable between said drive shaft and said product-handling elements for operating such elements at a predetermined second point in the rotation of the cylinder for causing delivery of the severed product at a second point about the periphery thereof, and manually operable shifting means for alternative shifting of said drive connections into active position.

19. In a mechanism for handling severed products at the delivery end of a printing press, a collecting cylinder having sets of product-handling elements thereon, the product-handling elements in each of said sets being spaced in a longitudinal row, drive shafts extending longitudinally in said cylinder adjacent respective sets of product-handling elements, means for rotating said drive shafts at a speed which is integrally related to that of the cylinder, means for supplying two different products A and B to the successive sets of product-handling elements, first and second receiving cylinders spaced about the periphery of the collecting cylinder, a first driving connection shiftable between each drive shaft and its associated product-handling elements for causing delivery of all products A to said first cylinder and all products B to said second cylinder, a second drive connection shiftable between each drive shaft and its associated product-handling elements for causing delivery of all products collect to one of said receiving cylinders, and manually operable shifting means for alternative shifting of said drive connections into active position.

20. In a mechanism for forwarding signatures at the delivery end of a printing press, a cylinder, a series of signature-forwarding elements longitudinally spaced along the surface of the cylinder for picking up and delivering a signature at spaced points about the cylinder periphery, a cam shaft arranged adjacent said elements and having a first set of cams and a second set of cams alternately spaced thereon, cam followers on said signature-forwarding elements, means for simultaneously producing a relative shift between said cam followers and said cams so that the cam followers selectively engage one of said sets of cams, means for rotating said cam shaft at twice the speed of said cylinder, the cams in at least one of said sets having two lobes thereon for operating the signature-forwarding elements twice during each two revolutions of the cylinder.

21. In a mechanism for forwarding signatures at the delivery end of a printing press, a cylinder, a series of signature-forwarding elements longitudinally spaced along the surface of the cylinder for picking up and delivering a signature at spaced points about the cylinder periphery, a cam shaft arranged in said cylinder having a first set of cams and a second set of cams thereon interspaced with one another, cam followers on said signature-forwarding elements, means for simultaneously producing a relative shift between said cam followers and said cams so that the cam followers selectively engage one of said sets of cams, and means for rotating said cam shaft at a speed which is integrally related to the speed of said cylinder.

22. In a printing press delivery mechanism for straight and collect delivery, the combination comprising a collecting cylinder, a pair of cutting cylinders for feeding severed products thereto, means including first and second receiving cylinders arranged at spaced points about the periphery of the collecting cylinder for receiving the severed products, longitudinal sets of signature-forwarding elements spaced at intervals about the periphery of said collecting cylinder, cam followers on said signature-forwarding elements, longitudinal cam shafts arranged adjacent said sets of signature-forwarding elements respectively, said cam shafts having a first set of cams and a second set of cams alternately spaced thereon, means for simultaneously producing a relative shift between said cam followers and said cams so that the cam followers selectively engage one of said sets of cams, means for rotating said cam shafts at half the speed of said cylinder, the cam in said first set having two lobes thereon for operating the signature-forwarding elements twice during each two revolutions of the cylinder as required for straight delivery and the cams in said second set having one lobe for operating the signature-forwarding elements once during each two revolutions as required for collect delivery.

23. In a mechanism for forwarding signatures at the delivery end of a printing press, a cylinder, a series of signature-forwarding elements longitudinally spaced along the surface of the cylinder and mounted for movement between a signature-engaging position and a signature-releasing position, a cam shaft means extending longitudinally adjacent said signature-forwarding elements, first and second sets of cams mounted on said cam shaft means to provide alternate cams for each of said signature-forwarding elements, cam followers on said signature-forwarding elements, means for shifting the cam shaft means between a first position in which the cam followers are engaged with the first set of cams and a second position in which said cam followers are engaged with the second set of cams, and means for rotating said cam shaft means in step with driving rotation of said cylinder and at a speed integrally related to the speed of the cylinder, said sets of cams being respectively profiled to produce different timing of the associated forwarding elements.

24. In a mechanism for forwarding signatures at the delivery end of a printing press, a cylinder having a series of signature-forwarding elements arranged in a longitudinal series thereon, a drive shaft extending longitudinally in said cylinder adjacent said signature-forwarding elements, means for driving said shaft in step with driving rotation of said cylinder and at a speed which is integrally related thereto, a first driving connection shiftable into active position between said drive shaft and said signature-forwarding elements for operating such elements in accordance with a first pickup-and-delivery cycle, a second drive connection shiftable into active position between said drive shaft and said signature-forwarding elements for operating such elements in accordance with a second pickup-and-delivery cycle, and manually operable shifting means for alternative shifting of said drive connections into active position.

References Cited in the file of this patent

UNITED STATES PATENTS

| | | |
|---|---|---|
| 472,318 | Stonemetz | Apr. 5, 1892 |
| 612,831 | Crowell | Oct. 25, 1898 |
| 671,993 | Firm | Apr. 16, 1901 |
| 1,304,232 | Wood et al. | May 20, 1919 |
| 1,900,288 | Jordhoy | Mar. 7, 1933 |
| 2,381,093 | Worthington | Aug. 7, 1945 |
| 2,589,428 | Pearce | Mar. 18, 1952 |